United States Patent [19]

Toyoda

[11] 3,753,388

[45] Aug. 21, 1973

[54] EXPOSURE METER EMPLOYING PHOTODIODE

[75] Inventor: Kenji Toyoda, Shinjuku-ku, Tokyo, Japan

[73] Assignee: Nippon Kogaku K.K., Tokyo, Japan

[22] Filed: Nov. 30, 1971

[21] Appl. No.: 203,350

[30] Foreign Application Priority Data

Nov. 30, 1970 Japan .............................. 45/105715

[52] U.S. Cl. ................ 95/10 R, 95/10 CE, 356/226

[51] Int. Cl. .............................................. G01j 1/42

[58] Field of Search ...................... 95/10 CE, 10 CT, 95/10 R; 356/218, 226

[56] References Cited

UNITED STATES PATENTS

| | | | |
|---|---|---|---|
| 3,698,299 | 10/1972 | Arisaka et al. | 95/10 |
| 3,062,092 | 11/1962 | Schmidt | 356/226 |
| 3,464,773 | 9/1969 | Way | 95/10 X |
| 3,532,035 | 10/1970 | Fujii | 95/16 |
| 3,574,443 | 4/1971 | Nanua | 356/226 X |
| 3,623,816 | 11/1971 | Slavik | 356/226 X |

*Primary Examiner*—Samuel S. Matthews
*Assistant Examiner*—Michael L. Gellner
*Attorney*—Joseph M. Fitzpatrick, John Thomas Cella et al.

[57] ABSTRACT

Exposure meter using a photodiode, wherein open-circuit voltage of the photodiode is applied to the gate of a field-effect transistor. Between the source of said field-effect transistor and the negative terminal of a power source, a variable resistor is inserted and is interlocked with at least one of the exposure factors of the film sensitivity, the aperture of a photo-lens and the exposure time, so as to vary the value of the resistance of the variable resistor.

18 Claims, 7 Drawing Figures

PRIOR ART FIG. 1
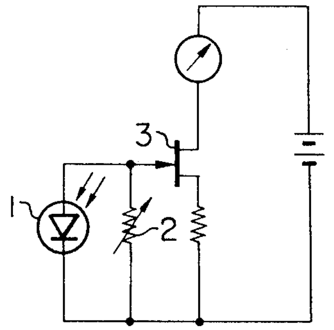
FIG. 2
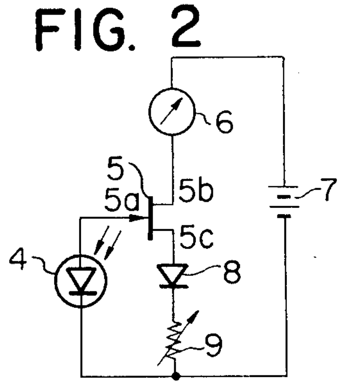
FIG. 3
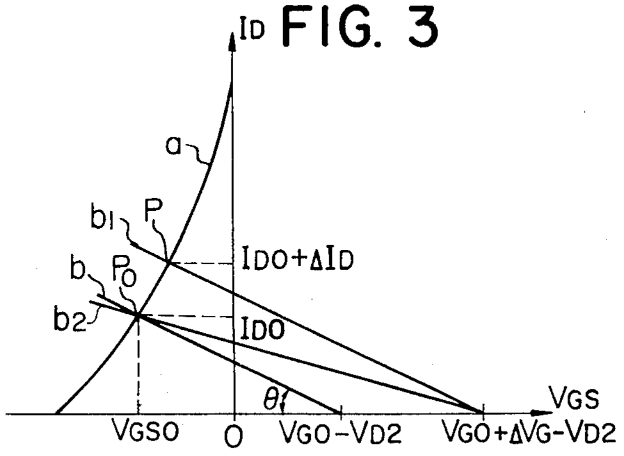
FIG. 4
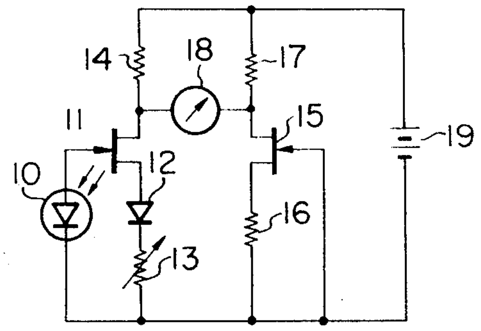

EXPOSURE METER EMPLOYING PHOTODIODE

BACKGROUND OF THE INVENTION

1. Field of the Invention

This invention relates to exposure meters and more particularly, to such meters employing photodiodes and used in photographic cameras.

2. Description of the Prior Art

It is known in conventional exposure meters employing photodiodes, to connect a variable resistor in series with the photodiode, and to adjust same in response to at least one of the following exposure factors: the film speed or sensitivity, the aperture stops of a camera lens or the exposure time or shutter speeds, so as to vary its resistance. Thus, in FIG. 1, illustrating a known exposure meter circuit, the voltage drop across the variable resistor 2 by the photocurrent of the photodiode 1, that is the gate voltage of a field-effect transistor 3 is made constant by varying the resistance of the variable resistor 2 so as to obtain the optimum exposure. However, the output current of the photodiode 1 is a very small current of the order of tens of pico amperes to hundreds of nano amperes, and varies in a wide range, so that in order to obtain the sufficient output and to attain a high selectivity, the resistance of the variable resistor 2 must vary in a high resistance range from tens of kilo ohms to hundreds of meg ohms. In addition, the resistance of the variable resistor 2 must change exponentially, and it is extremely difficult to fabricate such variable resistors with a high degree of accuracy. Furthermore, such variable resistors are generally unstable when affected by variations in temperature and humidity.

SUMMARY OF THE INVENTION

An object of the present invention is to provide an improved exposure meter employing a photodiode in which resistance of a variable resistor adjusted according to the exposure factors is comparatively low and is varied in a relatively small range.

Another object of the invention is to provide an improved exposure meter employing a photodiode in which a change in said resistance against EV (exposure value) is constant.

Another object of the invention is to provide an improved exposure meter employing a photodiode in which the variable resistor is simple to manufacture and is stable when subjected to variations in temperature and humidity.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

Several specific embodiments of the invention have been chosen for purposes of illustration and description, and are shown in the accompanying drawings, forming a part of the specification wherein:

BRIEF DESCRIPTION OF THE DRAWINGS

FIG. 1 is a circuit diagram of a prior art exposure meter;

FIG. 2 is a circuit diagram of an exposure meter in accord with the present invention;

FIG. 3 is a graph illustrating the operational characteristics of the exposure meter shown in FIG. 2; and FIGS. 4, 5, 6 and 7 are circuit diagrams of variations of the present invention.

DESCRIPTION OF THE PREFERRED EMBODIMENTS

Figure 5:
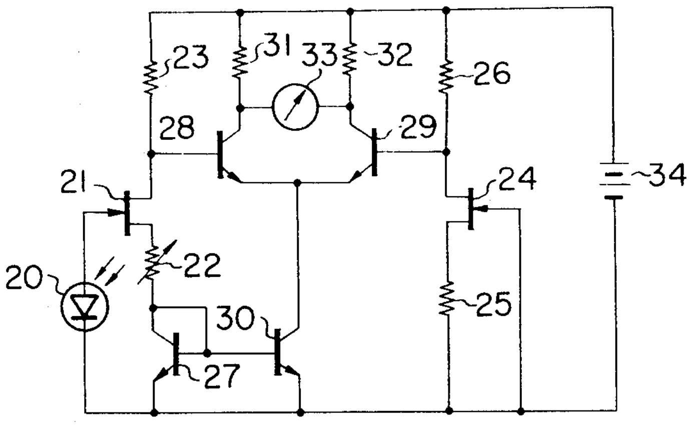

Referring to FIG. 2, there is shown an embodiment of the present invention wherein a gate terminal **5*a* of an n-channel field-effect transistor 5 is connected to the anode of a silicon photodiode 4, and a drain terminal 5*b* of the transistor is connected to the positive (+) terminal of a battery 7 through an ammeter 6. A source terminal 5*c* of the transistor 5 is connected through a forward-biased silicon diode and a variable resistor 9 to the cathode of the silicon photodiode 4 and to the negative (−) terminal of the battery 7**.

Resistance of the variable resistor 9 is adjusted according to the film speed, the aperture stops of a camera lens and the exposure time.

The gate input resistance of the field-effect transistor 5 is sufficiently high so that the terminals of thesilicon photodiode 4 may be regarded as being opened. As a consequence, the gate voltage VG of the field-effect transistor 5 coincides with the open-circuit voltage $V_{D1}$, and is given by $$V_G = V_{D1} = C \log B \qquad 1$$

where B = brightness of an object; and

C = a proportionality factor.

From Eq. (1), it is seen that $V_{D1}$ that is $V_G$ is in proportion to the logarithm of brightness of the subject. Almost all of the drain current $I_D$ flows through the source **5*c* of the field-effect transistor 5 so that the voltage drop $V_R$ across the variable resistor 9** is given by $$V_R = R_S I_D \qquad 2$$

where $R_S$ = resistance of the variable resistor 9. The forward voltage drop $V_{D2}$ across the silicon diode 8 remains almost unchanged so that the source terminal voltage $V_S$ of the field-effect transistor 5 is given from Eq. (2) by $$V_S = V_{D2} + R_S I_D \qquad 3$$

From Eq. (3), the voltage between the gate **5*a* and source 5*c* of the field-effect transistor 5** is given by $$V_{GS} = V_G - V_S = V_G - V_{D2} - R_S I_D \qquad 4$$

Eq. (4) is shown in the graph in FIG. 3 wherein the voltage between the gate and source $V_{GS}$ is plotted against the abscissa and the drain current $I_D$ against the ordinate. The static characteristic curve of the field-effect transistor 5 is indicated by *a*.

Now, assume that $V_{GO}$ be applied to the gate and that the variable resistor 9 has a resistance $R_{SO}$; and a straight line *b* is drawn from the point $V_{GO} - V_{D2}$ on the abscissa with a slope $\tan\theta = 1/R_{SO}$. Then the current $I_{DO}$ and voltage $V_{GSO}$ at the intersection $P_o$ with the curve *a* give the drain current and the voltage between the gate and source.

As $V_G$ changes to $V_{GO} + \Delta V_G'$ the straight line *b* is displaced as indicated by $b_1$ so that the point $P_o$ changes to the point P. As a consequence, the drain current changes to $I_{DO} + \Delta I_D$. When the variable resistor 9 is adjusted so that $R_S = R_{SO} + \Delta R_S'$ then the straight line $b_1$ is displaced to the straight line $b_2$. Then, from Eq. (4), the value $R_S$ of the variable resistor 9 which gives the drain current $I_{DO}$ at a given $V_G$ is given by $$R_S = (V_G - V_{D2} - V_{GSO})/I_{DO} \tag{5}$$

or $$\Delta R_S = \Delta V_G/I_{DO} \tag{6}$$

$V_G$ changes, as shown by Eq. (2), when the brightness of the subject changes. Therefore, the combination of the film speeds or sensitivity, the apertures of the camera lens and the exposure time or shutter speeds, which gives the optimum exposure for a subject having a given brightness, is interrelated with the value $R_S$ of the variable resistor 9 which is given by Eq. (5) when the gate voltage for the given brightness is $V_G$. Then the optimum exposure may be attained by varying the three exposure factors, that is the film speeds or sensitivity, the apertures of the camera lens and the exposure time or shutter speeds in such a manner that the ammeter 6 indicates $I_{DO}$.

The gate voltage $V_G$ is given by a logarithmic function of brightness of a subject as shown by Eq. (1) so that the rate of change of $V_G$ for the change of brightness of the subject by 1 EV is constant. That is, from the characteristics of the photodiodes, the rate of change is about 18 milli-volt.

As is clear from Eqs. (5) and (6), the variable resistor 9 may have its value changed linearly for a change in value of EV. More particularly, when $I_{DO} = 0.2$mA, the rate of change $\Delta R_S$ is 90 ohms per change of 1 EV. This value is very small. From the characteristics of the field-effect transistors and silicon photodiodes now readily available in the market, the following values may be realized:

$I_{DO} = 0.2$ mA, $V_{GSO} = -800$ mV, $V_{D2} = 500$ mV, and $V_G = 0 - 500$ mV, so that $R_S = 1.5 - 4$ kilo ohms from Eq. (5). Variable resistors which change in this range of 1.5 – 4.0 kilo ohms may be easily manufactured with a required degree of accuracy and stability when subject to temperature and humidity variations.

The open-circuit voltage of the silicon photodiode 4 has a temperature effected variation of the order of −3 mV/°C, but this temperature variation is equal to that of the forward voltage drop $V_{D2}$ of the silicon diode 8, so that the effects of these temperature variations cancel each other out.

Next, the second embodiment of the present invention will be described with reference to FIG. 4. This embodiment is substantially similar to the first embodiment in arrangement except that in place of the ammeter 6, a fixed resistor 14 is inserted so that the voltage drop across this fixed resistor 14 may be compared with the voltage drop across a fixed resistor 17 inserted into a constant-current circuit consisting of a field-effect transistor 15 and a fixed resistor 16. The difference is indicated by an ammeter 18. The value of the variable resistor 13 is varied in response to the film speeds, the apertures and shutter speeds so that the ammeter 18 may indicate a fixed value. Thus, the optimum exposure is attained as in the case of the first embodiment.

In the first and second embodiments described above with reference to FIGS. 2, 3 and 4, the anodes of the silicon diodes 8 and 12 are connected to the sources of the field-effect transistors 5 and 11, and the variable resistors 9 and 13 are connected in series with the anodes of the silicon diodes 8 and 12. But, it should be noted that even when the positions of the silicon diodes and the variable resistors are exchanged; that is, even when the variable resistors are inserted in place of the diodes with the diodes in the place of the variable resistors, the function of the circuits remains unchanged.

Next, the third embodiment will be described with particular reference to FIG. 5. The third embodiment has a silicon diode 20, a field-effect transistor 21 and a variable resistor 22 which are arranged in a similar manner as described in the first and second embodiments. An npn transistor 27 connected as a diode serves as an element for compensating the variation of the open-circuit voltage of the silicon photodiode 20 due to temperature variation as in the case of the silicon diodes 8 and 12 in the first and second embodiments. In response to the film speeds, the apertures and the shutter speeds, the value of the variable resistor 22 is varied so that optimum exposure may be attained when the drain current of the field-effect transistor 21 becomes a predetermined value $I_{DO}$. The field-effect transistor 24 and the fixed resistor 25 constitute a constant-current circuit, and a difference amplifier consisting of npn transistors 28, 29 and 30 and fixed resistors 31 and 32, and a pair of fixed resistors 23 and 26 serve to compare the drain currents of the field-effect transistors 21 and 24 to flow the current corresponding to the difference therebetween through an ammeter 33. The three exposure factors, the film speeds, the apertures and the shutter speeds, are so varied that the ammeter 33 indicates a predetermined value $I_{DO}$ of the drain current of the field-effect transistor 21. Thus, the optimum exposure may be attained as in the case of the first and second embodiments. In addition, because of the amplification by the difference amplifier, the selectivity may be further improved.

The variation in collector current of the npn transistor 30 greatly affects the current flowing through the ammeter 33 so that the voltage drop across the npn transistor 27 is applied to the transistor 30 as its base bias voltage in order to prevent variations in the collector current of the transistor 30 due to variations in power source voltage and temperature variations.

In the first, second and third embodiments described, the silicon diodes 8 and 12 and the diode-connected npn transistor 27 are inserted between the sources of the field-effect transistors 5, 11 and 21 and the negative terminals (−) of the batteries 7, 19 and 34 in order to compensate for temperature variations in the open-circuit voltage of the silicon photodiodes 4, 10 and 20, but it will be noted that other suitable means may be substituted for these diodes and transistor. This will be described hereinafter in the fourth embodiment with particular reference to FIG. 6.

A p-channel field-effect transistor 35 and a fixed resistor 36 constitute a constant-current circuit. The drain of the field-effect transistor 35 is connected to the negative (−) terminal of a battery 38 through a silicon diode forward-connected. The anode of a silicon photodiode 39 is connected to the drain of the field-effect transistor 35 while the cathode to the gate of an n-channel field-effect transistor 40 whose drain is connected to the positive terminal of the battery 38 through an ammeter 41. The source of the field-effect transistor 40 is connected through a variable resistor 42 to the negative (−) terminal of the battery 38.

The gate voltage $V_G$ of the field-effect transistor 40 is given by $$V_G = V_{D2} - V_{D1} \tag{7}$$

where $V_{D1}$ = open-circuit voltage of the silicon photodiode 39; and $V_{D2}$ = voltage drop across the silicon diode 37. The variations in $V_{D1}$ and $V_{D2}'$ due to the temperature variation, are equal and cancelled with each other, so that the gate voltage $V_G$ remains unchanged in spite of the temperature variation. $V_{D1}$ is given by Eq. (1), so that substituting it in Eq. (7), we have $$V_G = V_{D2} - C \log B \tag{8}$$

The resistance $R_S$ of the variable resistor 42 to give a predetermined drain current $I_{DO}$ of the field-effect transistor 40 is given from Eq. (5).

$$R_S = (V_G - V_{GS})/I_{DO} \tag{9}$$

As in the first embodiment, the combination of the film sensitivity, the aperture and the shutter speed for giving the optimum exposure of a subject having a given brightness is interrelated with the value $R_S$ of the variable resistor 42 given by Eq. (9) where $V_G$ is a value corresponding this given brightness. Thus, the function of the circuit of the fourth embodiment is identical with that of the first embodiment. Furthermore, the variation in open-circuit voltage of the silicon photodiode 39, due to temperature variations, is compensated for by an arrangement different from those of the first, second and third embodiments.

Figures 6, 7:
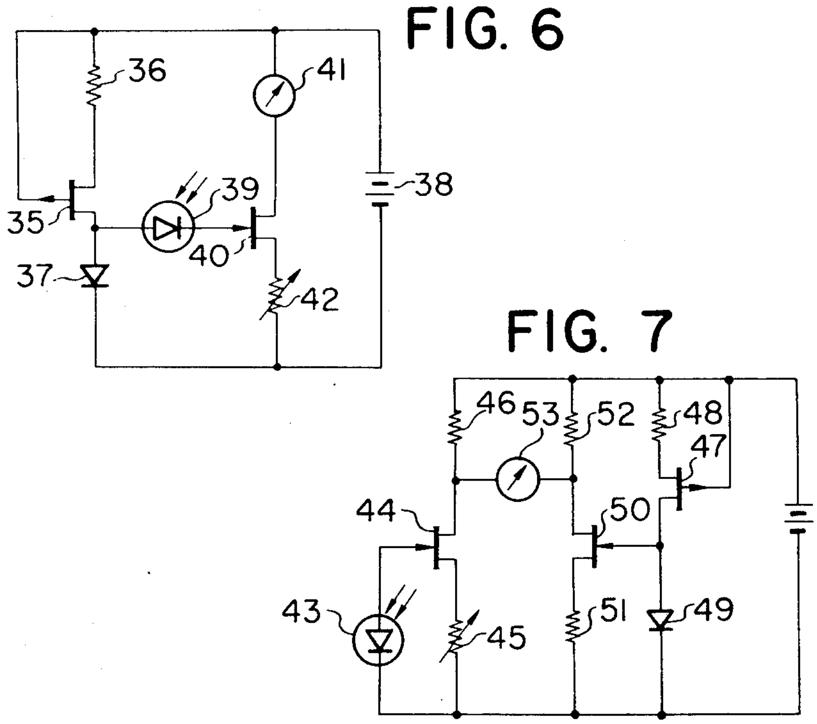

The fifth embodiment of the present invention will be described hereinafter with particular reference to FIG. 7. The fifth embodiment is similar to the second embodiment illustrated in FIG. 4 except that the silicon diode 12 is eliminated. Furthermore, the arrangement consisting of a p-channel field-effect transistor 47, a fixed resistor 48 and a silicon diode 49 is similar to that of the third embodiment consisting of the field-effect transistor 35, the fixed resistor 36 and the silicon diode 37. The drain of the field-effect transistor 47 is connected to the gate on n-channel field-effect transistor 50, and the field-effect transistors 44 and 50 are matched. As in the case of the first embodiment, the value of the variable resistor 45 is varied depending upon the combination of the film speed, the aperture and the shutter speed so that optimum exposure may be attained when the drain current of the field-effect transistor 44 becomes equal to the drain current of the field-effect transistor 50 which is determined by the voltage drop across the silicon diode 49 and that across the fixed resistor 51. The coincidence of these two drain currents may be measured by a circuit consisting of an ammeter 53 and fixed resistors 46 and 52. Thus, the function of the fifth embodiment is similar to that of the first embodiment illustrated in FIG. 2. The variation in open-circuit voltage of the silicon photodiode 43 may be compensated by the variation in voltage drop across the silicon diode 49 due to the temperature variation, so that the reading of the ammeter 53 is not adversely affected.

In all of the five embodiments described above, p-channel field-effect transistors may be employed instead of the n-channel field-effect transistors, and vice versa with the suitable change in the polarities of the component parts. Furthermore, when the so-called pentode characteristics of the field-effect transistors are utilized, the errors due to the variation in power source voltage may be eliminated.

In the five embodiments described above, the values of the variable resistors 9, 13, 22, 42 and 45 have been described as being varied in response to all of the film speeds, the apertures and the shutter speeds, but it will be understood that when one or two factors of these three exposure factors are varied, for example in response to a stop placed in front of the silicon diode, the value of the variable resistor may be changed in response to only one or two exposure factors.

The variable resistor 9, 13, 22 or 45 may be composed of a plurality of variable resistors connected in series with each other so that each of said variable resistors is adjusted by a respective one of the exposure factors.

In all of the five embodiments, the silicon photodiodes are employed as photoelectric-effect elements, but it is understood that other pn junction photodiodes may be employed as far as Eq. (1) is satisfied. Instead of the silicon diodes 8, 12, 37 and 49, other suitable diodes may be employed.

From the foregoing description, it is seen that the resistance and the range of variation of the variable resistor in the exposure meter or exposure control system in accordance with the present invention may be remarkably lowered as compared with the variable resistors used in the prior art exposure meters or exposure control systems of the type employing the photodiodes, the variable resistors varying their resistance in response to at least one of the three exposure factors; that is, the shutter speeds, the apertures and the film speeds. For example, as compared with the variable resistors employed in the conventional exposure control system varying from tens of kilo ohms to hundreds of meg ohms, the variable resistor used in the system of the present invention varies only through a range from 1.5 kilo ohms to 4 kilo ohms. Furthermore, the rate of change in resistance per 1 EV (exposure value) may be made constant. Therefore, it is not necessary to employ expensive variable resistors which are difficult to manufacture. The present invention allows one to use variable resistors which are stable under temperature and humidity variations.

1. An exposure control system for use in photographic work, said system comprising a field-effect transistor having a gate terminal, and source and drain terminals, a photodiode connected between said gate terminal and a junction, a variable resistor connected between said source terminal and said junction, said variable resistor being interconnected to at least one determining exposure factor, to vary its resistance in response to setting of said at least one of said exposure factors and a battery connected between said junctions and said drain terminal.

2. An exposure control system according to claim 1, wherein a current indicating device is connected in series with said battery between said junction and said drain terminals.

3. An exposure control system according to claim 1, wherein a temperature responsive device is connected in series with said variable resistor between said source terminal and said junction.

4. An exposure control system according to claim 1, wherein a constant current circuit is connected in parallel with said field-effect transistor and wherein a current indicating device is connected between the drain terminal of said transistor and said constant current device.

5. An exposure control system according to claim 1, wherein a second field-effect transistor is connected with its drain and source terminals in parallel with the first field-effect transistor across said battery, wherein the gate terminal of said second field-effect transistor is connected to said junction and wherein a current indicating device is connected between the drain terminals of the two transistors.

6. An exposure control system according to claim 5, wherein said current indicating device is connected across a difference amplifier formed of a pair of transistors, the base terminals of which are connected respectively to the drain terminals of the field-effect transistors.

7. An exposure control system according to claim 6, wherein a temperature compensating circuit is provided including a first transistor having its collector and emitter terminals connected in series with said variable resistor between the source terminal of said first field-effect transistor and said junction and a second transistor having its collector and emitter terminals connected in series between said difference amplifier and said junction and means connecting the base terminals of first and second transistors to the collector terminal of the first transistor.

8. An exposure control system according to claim 1, wherein the anode of said photodiode is connected to the gate terminal of said field-effect transistor and the cathode of said photodiode is connected to said junction.

9. An exposure control system according to claim 1, wherein a second field-effect transistor which has a polarity opposite to that of said field-effect transistor is connected in series with a temperature compensating diode across the battery to provide a constant current circuit and wherein one end of said photoconductive diode is connected to the drain of said second field-effect transistor while the other end of said photoconductive diode is connected to the gate of said first field-effect transistor.

10. An exposure control system according to claim 1 wherein a second field-effect transistor is connected in parallel with the first field-effect transistor, wherein a current indicating device is connected between the drain terminals of the first and second field-effect transistors and wherein a third field-effect transistor which as a polarity opposite to that of said first field-effect transistor is connected in series with a temperature responsive diode across said battery to provide a constant current circuit, the drain terminal of said third field-effect transistor being connected to the gate terminal of the first field-effect transistor.

11. An exposure control system in a camera, comprising a first field-effect transistor having a gate, source and drain terminals; a photodiode adapted to receive light from an object to be photographed; one end of said photodiode being connected to said gate terminal; a battery connected between said drain terminal and the other end of said photodiode; a variable resistor connected between said source terminal and the first junction between said battery and said other end of said photodiode, said variable resistor being interconnected to at least one exposure determining factor, so that the combination of the brightness of the object to be photographed and said exposure factors obtains a proper exposure when the amount of current flowing through said source and drain terminals becomes a predetermined value.

12. An exposure control system according to claim 11, further comprising an indicating device controlled by said current flowing through said drain and source terminals for indicating the proper exposure.

13. An exposure control system according to claim 12, wherein said indicating device is connected to the drain-source circuit.

14. An exposure control system according to claim 12, further comprising a temperature responsive device connected in series with said variable resistor between said source terminal and said first junction.

15. An exposure control system according to claim 14, further comprising a first resistor connected between said drain terminal and said battery; a second and third resistors; and a second field-effect transistor having a gate terminal connected to said first junction, a drain terminal connected through said second resistor to the second junction between said battery and said first resistor, and a source terminal connected to the first junction through said third resistor, said indicating device being connected between said drain terminals of said first and second field-effect transistors.

16. An exposure control system according to claim 15, wherein said temperature responsive device is a first transistor of which collector and base terminals are connected to each other and of which emitter terminal is connected to said first junction, and further comprising a differential amplifier including a pair of transistors of which base terminals are connected respectively to the drain terminals of said first and second field-effect transistors, emitter terminals are connected to each other and of which collector terminals each are connected to said second junction through a resistor, and an additional transistor of which collector terminal is connected to said emitter terminals of said pair, emitter terminal is connected to said first junction and of which base terminal is connected to said collector and base terminals of said first transistor.

17. An exposure control system according to claim 12, further comprising a second field-effect transistor having polarity opposite to that of said first field-effect transistor and connected across said battery to provide a constant current circuit, the drain terminal of said second field-effect transistor being connected to the other end of said photodiode; and a temperature compensating diode connected between said battery and the junction between said drain terminal of said second field-effect transistor and the other end of said photodiode.

18. An exposure control system according to claim 12, further comprising a first resistor connected between said drain terminal and said battery; a second and third resistors; a second field-effect transistor having a gate terminal, a drain terminal connected through second resistor to the second junction between said battery and said first resistor, and a source terminal connected to the first junction through said third resistor; a third field-effect transistor having polarity opposite to that of said first field-effect transistor and connected across said battery to provide a constant current circuit, the drain terminal of said third field-effect transistor being connected to the gate terminal of said second field-effect transistor; and a temperature compensating diode connected between said battery and the junction between said drain terminal of the third field-effect transistor and said gate terminal of said second field-effect transistor, said indicating device being connected between the drain terminals of said first and second field-effect transistor.

* * * * *

UNITED STATES PATENT OFFICE
CERTIFICATE OF CORRECTION

Patent No. 3,753,388 Dated August 21, 1973

Inventor(s) KENJI TOYODA

It is certified that error appears in the above-identified patent and that said Letters Patent are hereby corrected as shown below:

Column 2, line 31, change "thesilicon" to -- the silicon --.
Column 7, line 8, change "determining exposure" to -- exposure determining --; line 10, change "junctions" to --junction--.

Signed and sealed this 2nd day of April 1974.

(SEAL)
Attest:

EDWARD M.FLETCHER,JR.
Attesting Officer

C. MARSHALL DANN
Commissioner of Patents